US012023888B2

(12) United States Patent
Carboni et al.

(10) Patent No.: US 12,023,888 B2
(45) Date of Patent: Jul. 2, 2024

(54) FORMING UNIT AND METHOD FOR FORMING A CONTAINER AND PACKING APPARATUS WITH SUCH A FORMING UNIT

(71) Applicant: G.D S.P.A., Bologna (IT)

(72) Inventors: Salvatore Carboni, Bologna (IT); Antonio Vitali, Bologna (IT)

(73) Assignee: G.D S.P.A., Bologna (IT)

( * ) Notice: Subject to any disclaimer, the term of this patent is extended or adjusted under 35 U.S.C. 154(b) by 0 days.

(21) Appl. No.: 17/997,999

(22) PCT Filed: Jul. 5, 2021

(86) PCT No.: PCT/IB2021/055997
§ 371 (c)(1),
(2) Date: Nov. 4, 2022

(87) PCT Pub. No.: WO2022/009062
PCT Pub. Date: Jan. 13, 2022

(65) Prior Publication Data

US 2023/0173781 A1 Jun. 8, 2023

(30) Foreign Application Priority Data

Jul. 9, 2020 (IT) ........................ 102020000016693

(51) Int. Cl.

| | |
|---|---|
| ***B31B 50/44*** | (2017.01) |
| ***B31B 50/62*** | (2017.01) |
| ***B65B 5/02*** | (2006.01) |
| ***B65B 35/30*** | (2006.01) |

(Continued)

(52) U.S. Cl.
CPC .......... *B31B 50/442* (2017.08); *B31B 50/624* (2017.08); *B65B 5/024* (2013.01);
(Continued)

(58) Field of Classification Search
CPC ..... B31B 50/442; B31B 50/44; B31B 50/624; B31B 2100/0026; B31F 1/0058;
(Continued)

(56) References Cited

U.S. PATENT DOCUMENTS 2,014,046 A 9/1935 Joslin
2,110,423 A 3/1938 Pope
(Continued)

FOREIGN PATENT DOCUMENTS

BE 640303 A 12/1963
DE 1030669 B 5/1958
(Continued)

OTHER PUBLICATIONS

International Search Report and Written Opinion for International PCT Application No. PCT/IB2021/055997 filed on Jul. 5, 2021, on behalf of G.D S.P.A. dated Jan. 4, 2022. 21 Pages.

*Primary Examiner* — Thomas M Wittenschlaeger
(74) *Attorney, Agent, or Firm* — Steinfl + Bruno LLP

(57) ABSTRACT

A forming unit for a container from a blank of the container. The unit includes a conveyor and at least one equipment secured to the conveyor. The equipment includes a forming device moving with continuous movement and forming a container from the blank during a predetermined forming path on the conveyor.

14 Claims, 5 Drawing Sheets

(51) Int. Cl.

| | |
|---|---|
| ***B65B 41/02*** | (2006.01) |
| ***B65B 43/10*** | (2006.01) |
| ***B65B 43/50*** | (2006.01) |
| ***B65B 51/02*** | (2006.01) |
| *B31B 100/00* | (2017.01) |
| *B31B 110/35* | (2017.01) |

(52) U.S. Cl.
CPC .............. *B65B 35/30* (2013.01); *B65B 41/02* (2013.01); *B65B 43/10* (2013.01); *B65B 43/50* (2013.01); *B65B 51/023* (2013.01); *B31B 2100/0026* (2017.08); *B31B 2110/35* (2017.08)

(58) Field of Classification Search
CPC ....... B65B 43/50; B65B 43/345; B65B 43/10; B65B 5/024; B65B 5/10; B65B 7/20; B65B 51/023; B65B 41/02; B65B 35/56; B65B 35/30
See application file for complete search history.

(56) References Cited

U.S. PATENT DOCUMENTS

| | | | | |
|---|---|---|---|---|
| 3,342,116 | A | 9/1967 | Roesner et al. | |
| 3,817,682 | A * | 6/1974 | Lefebvre | B31B 50/00 431/286 |
| 3,978,774 | A | 9/1976 | Royal | |
| 4,033,242 | A | 7/1977 | Rice et al. | |
| 4,673,381 | A | 6/1987 | Yamamoto et al. | |
| 5,462,223 | A | 10/1995 | Focke et al. | |
| 5,992,494 | A | 11/1999 | Focke et al. | |
| 2003/0182904 | A1 * | 10/2003 | Fields, Jr. | B31B 50/00 53/376.5 |
| 2008/0250759 | A1 | 10/2008 | Cash | |
| 2011/0166007 | A1 | 7/2011 | Langen | |
| 2013/0090223 | A1 | 4/2013 | Begin et al. | |
| 2022/0281202 | A1 * | 9/2022 | Varotto | B31B 50/003 |

FOREIGN PATENT DOCUMENTS

| | | | |
|---|---|---|---|
| DE | 102016004355 | A1 | 10/2017 |
| EP | 3305514 | A1 | 4/2018 |
| GB | 679726 | A | 9/1952 |
| GB | 1296097 | A | 11/1972 |
| GB | 1575125 | A | 9/1980 |
| GB | 2098092 | A | 11/1982 |
| GB | 2128134 | A | 4/1984 |
| GB | 2257650 | A | 1/1993 |
| WO | 2021/024079 | A1 | 2/2021 |

* cited by examiner

FORMING UNIT AND METHOD FOR FORMING A CONTAINER AND PACKING APPARATUS WITH SUCH A FORMING UNIT

CROSS REFERENCE TO RELATED APPLICATIONS

The present application is the US National Stage of International Patent Application No. PCT/IB2021/055997, filed on Jul. 5, 2021, which in turn, claims priority to Italian Application No. IT 102020000016693, filed on Jul. 9, 2020.

The present invention relates to a forming unit for a container, a method for forming a container as well as a packing apparatus with such a forming unit.

In particular, the forming unit is arranged to make a container from a blank. The method is intended for forming the container from said blank. The packing apparatus is intended to include such a forming unit.

In particular, the container formed from the blank is configured to be used as a container for packing loose articles.

The present invention finds a preferred, though not exclusive, application in the field of packaging in boxes of loose articles such as, for example, capsules of infusion products, for example coffee, a field to which reference may be made hereafter without loss of generality.

A packing apparatus, also known as a cartoning machine, generally comprises forming devices and/or forming units suitable for making box-shaped containers intended for containing products or articles.

Typically, these box-shaped containers are produced by the packing apparatus from a semi-finished product known as a blank of convenient shape according to the desired manufacturing processes and for which it is intended.

The blanks generally have a substantially planar shape in order to facilitate the transport and the storage thereof in the warehouse and are configured in such a manner as to allow the desired container to be obtained, by simply folding and fixing or gluing the various panels that make up the flat blank. This blank is typically produced from cardboard or thin cardboard with folding lines, which are made by creasing, which allow the container to be formed by means of folding operations of the different portions of the blank and by their mutual fixing. In this sense, therefore, the blank has an initial flat shape, assumes one or more spatial conformations of semi-finished blank during the various processing steps until it is completely formed into the desired final container.

During specific and subsequent processing operations carried out by the packing machine, the blank is brought into a different configuration corresponding to the desired box-shaped container.

Once the aforesaid box-shaped container has been made, it is possible, again thanks to devices included in the packing apparatus, to fill this container with articles or products of interest.

In this context, a process for treating a blank is called "continuous" when at each time coordinate the conveyor that moves the blank has a speed other than zero. This speed considered is the speed of the conveyor during any processing step which leads to forming a container from said blank with respect to a fixed reference system and is intended as the speed of the conveyor in its entirety.

Furthermore, since the conveyor comprises an equipment that is secured thereto, this "continuous" process condition can also be correlated to the aforesaid equipment.

In addition, since the equipment included in the conveyor in turn comprises a forming device for forming the blank, this "continuous" process condition is also met for the aforesaid forming device.

This means that the same forming device acting on a specific blank always has a speed other than zero during the process of forming the container from the blank. This considered speed is the speed of the forming device with respect to a fixed reference system and is understood as the speed of the forming device in its entirety. In other words, during such forming process, every part of the forming device must have a speed other than zero. In this sense, therefore, said speed of the forming device cannot be identified simply as the speed of a portion thereof in relative movement with respect to the aforesaid reference system.

Moreover, provided that the blank is always secured during the forming process to the forming device itself, the above-mentioned continuous process makes it possible to carry out a working process of the blank (or of the semi-finished blank when intermediate forming steps are considered) in which the blank also moves with continuous movement, thus having, for each part thereof, in each time coordinate of the aforesaid forming process, a speed other than zero.

Consistently, the term "fixed" or "stationary" or "alternating" indicate that the forming device (and therefore also the blank or semi-finished blank secured thereto), with respect to the same reference system external thereto, has during the forming process the same position for a determined time interval, within which time interval the forming device in its entirety is not moving.

By the term "forming" it is meant a series of working operations that end with the forming of a container.

In this context, the term "container" identifies a structure which is formed so to be able to contain material within it and in particular to be able to confine it at least laterally. In this sense, the material is considered to be "laterally confined" when the shape of the container is such as to retain the material within it even when the container, in its normal condition of use, is inclined with respect to the support plane through a predetermined angle, for example through 10° or 20°. Such a container may be formed by one or more walls depending on the content thereof. For example, the container may be a box-shaped body capable of receiving inside it products or articles that are to be transported and/or stored until their use.

According to another example, the container may be cup-shaped or hemispherical and thus composed by only a curved wall. In this case, said curved wall comprises a central bottom portion which preferably acts as a support plane for a desired product and a lateral crown which extends radially from the aforesaid bottom portion and which is formed to confine the product within the container during the intended operations of use.

According to another example, such a container does not have perfectly continuous walls, but such walls may also have holes or slots of such a dimension that the selected product can still be confined within that container. It is also useful to point out that the "forming" a container does not necessarily imply closing the container itself, but simply forming the abutment walls that are necessary to contain the desired object. In this sense, for example, a box-shaped body still having a raised wall which is not in contact with the edges of other lateral walls and thus defining an opening for inserting or removing products is to be considered as a fully formed but not yet closed container.

In other words, a container is formed when it is brought to a configuration whereby its function as a container is guaranteed. Preferably, when this forming condition is achieved, the latter can be considered as fully completed.

In this context the term "container" can be correlated with the term "packing" of which it is considered to be a broader and more general formulation.

In this context, a forming device which is secured to a moving conveyor is capable of carrying out the forming of a container "autonomously" when all the forming operations are carried out without the aid or the collaboration of manual operations by operators, also by using additional devices, robots or external mechanical kinematics cooperating with the forming device.

In this context, a first element is defined as "engaged" with a second element when an interaction is established between the two elements such that the first element is able to determine the movement of the second element. This interaction can be, for example, of a mechanical, magnetic or other nature.

A plane is said "horizontal" when it is parallel to the plane of the ground in which the forming unit object of the invention is installed.

Consistently, the term "vertical" identifies a direction which is perpendicular to the horizontal plane and so must be understood the terms relating to "upper" or "lower" positioning which refer to an orientation along the vertical direction.

In a known embodiment, the alternating type packing apparatus comprises a plurality of fixed process stations between which the blank is moved by means of pushers, carriers or conveyors which in turn generally comprise equipments, i.e. movable devices that are suitable for securing and transporting the blank or the box-shaped container during the various processing steps which take place during a stoppage.

The Applicant has observed that the processes generally implemented by packing apparatus operating on blanks provide for an interaction or collaboration between elements of an equipment and other elements which are positioned on structures that are independent of the equipment itself. In this way, it is possible to carry out different operations on the blanks by identifying a sequence of different process stations, the totality of which allows the predefined method to be completed obtaining the desired end product.

In particular, the Applicant has observed that, according to the teachings of the prior art, the equipment primarily acts as a transport system for a blank that must sequentially reach different stations where it is to be subjected to the predetermined processes that are envisaged at that specific station, carrying out at each station a specific operation of the semi-finished product of the desired end package.

In this technical field, there has therefore been constant development of the devices (which may be formed by robots or other kinematic devices) that can be used in the different process stations in order to try and reduce the working time required in each single station as much as possible.

Furthermore, significant resources were dedicated in this technical area to the implementation of systems that could work on several lines simultaneously in order to further reduce process times.

The Applicant has found that such technical solutions provide for moving such devices that operate, for example, on blanks at ever-increasing speeds, thus subjecting such operative parts to very high accelerations during the passage from the stoppage step to the movement or transfer step of the semi-finished product. It is significant to note that, if on the one hand these technical expedients allow to reduce the processing times, on the other hand they risk inducing accelerated wear or even breakage of the movable structure in use due to the extreme conditions of use.

In fact, the Applicant has found that the approach generally used in this technological field envisages a sequence of discrete movements of the equipment comprising the blank along a predetermined path in order to reach in succession the predefined working stations that remain fixed in space. This type of process is called alternating or intermittent.

The Applicant has also noted that these methods make it possible to try to accelerate the movements of the aforesaid devices as much as possible in order to be able to intervene as effectively and promptly as possible as soon as the blank reaches the predetermined process station.

It is also immediately understandable that it can be useful in terms of process resources for such movements of the devices to be carried out at the maximum speeds that can be reached even during the step of disengagement of the blank, in order to free the equipment as soon as possible, thus allowing the next blank to reach the processing station as quickly as possible.

The Applicant has found that this approach pushes the devices to move at extremely high speed peaks thus entailing, in addition to the aforementioned wear of the movable parts, also an increase in the possibility of error and/or collision during the process.

The Applicant has therefore perceived that it was necessary to approach the problem with a completely different methodological approach from the prior art, by setting up a continuous type forming process.

Thanks to this approach, the Applicant has verified that it is possible to manage the various process steps with greater freedom since the division between the step of moving the semi-finished product from one station to another and the actual processing step is waived, thus creating a single uninterrupted and joint movement and processing flow.

The Applicant has finally found that the desired optimisation of the aforementioned processes is achieved by making a forming unit that operates continuously for a blank of a container in which such continuity of process and movement is achieved by housing an equipment on a conveyor which moves with continuous movement, while the equipment comprises a forming device that is functionally and structurally designed to carry out the forming of the container from the blank during a predetermined path of the conveyor.

Preferably, the forming device is functionally and structurally designed to fully carry out the forming of the container from the blank.

It is significant to note that the logic of the process is very different from the one adopted in the prior art with respect to the concept of "fixed station" or "alternating" movement; in fact it is overcome the condition for which it is necessary to free a process station as soon as possible in order to be able to treat a successive blank, ensuring that all the processings take place continuously and uninterrupted during a movement.

In particular, in a first aspect thereof, the invention relates to a forming unit for forming a container from a blank of said container.

Preferably, said forming unit comprises a conveyor.

Preferably, the forming unit comprises at least one equipment which is secured to said conveyor.

Preferably, said at least one equipment comprises a forming device which moves with continuous movement and which is arranged to form a container from said blank during a predetermined forming path on said conveyor.

Thanks to these features, it is possible to form the container without having to interrupt the movement of the blank with stoppages, thus optimising the processing times and creating a single, continuous process flow.

In this way, the entire forming device moves fixedly with the conveyor of the blank, creating the condition for which, while the blank advances spatially and chronologically in the process, the elements of the forming device only have to make the relative movements necessary to complete the forming of the container, avoiding the continuous abrupt accelerations of the intermittent systems disclosed in the prior art and having more time to carry out the necessary relative movements, which can thus be more delicate on the blank.

Furthermore, this technical solution makes it possible to advantageously carry out a process with high production capacities, even on a single line. In fact, in this system it is possible to proceed in a continuous manner by managing a single row (mono-flow) of blanks, benefiting from the fact that it is not necessary to have a plurality of simultaneous and parallel lines which, moreover, multiply the potential problems and therefore the probability of stopping the entire machine in order to fix the critical points that have arisen.

In a second aspect thereof, the invention relates to a packing apparatus for packing articles comprising a forming unit for forming containers starting from blanks made according to the preceding aspect.

Thanks to this solution, the process of making and filling containers is optimised along a single production line operating continuously, thereby increasing the efficiency thereof.

In a third aspect thereof, the invention relates to a method for forming a container starting from a blank comprising the step of providing a forming unit.

Preferably, said forming unit comprises a conveyor to which at least one equipment is secured, in turn including a forming device which is provided to form said container from said blank.

Preferably, the method comprises the step of moving said conveyor.

Preferably, the method comprises the step of supplying said blank to said conveyor at said forming device.

Preferably, the method comprises the step of continuously forming said container from said blank by means of said forming device while said conveyor is moving.

Thanks to this method, it is possible to form the container from the blank without ever having to interrupt the continuous movement of the blank being processed, thereby optimising production speeds and reducing the accelerations or decelerations that are necessary for operating the forming devices and the conveyor itself correctly.

In a fourth aspect thereof, the invention relates to a forming unit for forming a container starting from a blank of said container comprising a conveyor to which at least one equipment is secured.

Preferably, said equipment comprises a forming device capable of forming said container from said blank during a predetermined forming path on said conveyor.

In a fifth aspect thereof, the invention relates to a method for forming a container starting from a blank comprising the step of providing a forming unit comprising a conveyor to which at least one equipment is secured, in turn including a forming device which is provided to form said container starting from said blank.

Preferably, the method comprises the step of completely forming said container starting from said blank by means of said forming device.

Preferably, the method comprises the step of moving said conveyor.

Preferably, the method comprises the step of supplying said blank to said conveyor at said forming device.

Preferably, the method comprises the step of starting the forming of said container from said blank by means of said forming device.

Preferably, the method comprises the step of completing the forming of said container from said blank by means of said forming device independently of the movement of said conveyor.

In this way, it is possible to ensure the completion of the forming of the container from the blank, regardless of the spatial advancement of the blank along the process path and in particular of the movement of the conveyor used for the displacement of the blank.

The present invention, in at least one of the aforesaid aspects, may have at least one of the further preferred features set out below.

In one embodiment, said forming device is formed so as to be capable of autonomously carrying out said forming of said container.

This makes it possible to carry out the intended forming operations using the forming device alone, independently of devices outside the forming unit.

According to one embodiment, said conveyor is a rotary carousel with a preferably vertical or horizontal rotation axis.

Owing to this technical solution it is possible to reduce and optimise the overall space required by the forming unit. In fact, in this way the path followed by the conveyor is arranged in a simple and effective way and the desired length of the conveyor can be obtained by reducing or increasing the diameter of the rotary carousel. Furthermore, it is easy to adapt the entry and exit position of the blank by simply changing the rotation speed of the carousel and/or its diameter according to the user's needs.

Preferably, said forming device comprises a piston, which is configured to engage with said blank.

Preferably, said piston is formed to move said blank along a predefined trajectory inside a seat which is formed to cooperate with said piston in order to form said container from said blank.

In this way, it is possible to form the container from the blank using just one piston and one seat.

Preferably, said piston engages with the surface of an abutment panel of said blank.

In this way, the piston acts only on a single abutment face of the blank, i.e. the abutment panel, and can complete the forming of the blank by pushing and moving said single surface.

In this way, the kinematics required for the forming operations are greatly simplified and can be easily controlled, optimised and replaced if necessary.

Preferably, said predefined trajectory has an orientation which is substantially parallel with said vertical rotation axis of said rotary carousel.

Thanks to this technical solution, the housing and the treatment of the blank inside the seat is facilitated since the blank is subjected to the force of gravity as well as the pressure exerted on it by the piston.

In fact, this makes it possible to position and/or centre the blank easily and symmetrically with respect to the seat.

Preferably, said rotary carousel substantially defines a movement direction within a movement plane. Preferably, the movement plane is a horizontal plane.

Thanks to this technical solution, it is possible to manage the movement of the blank and its relative engagement with respect to the piston in an ideal and simplified manner, since this orientation remains uniform in space and does not provide for any three-dimensional variations in position. Furthermore, by using a horizontal movement plane, i.e. parallel with the plane of the ground, different forces acting on the moving devices and on the blanks are balanced symmetrically, simplifying the working processes.

Preferably, said forming path corresponds to a circular arc which is defined by a rotation about the axis of said rotary carousel through an angle between 90° and 270°, more preferably between 120° and 240°, and even more preferably between 160° and 200°.

Thanks to this technical solution, the forming step is optimized starting from an initial condition and then developing along a first part of the rotation of the rotary carousel, using the second part of the rotation to return the forming device to the initial condition.

According to a preferred embodiment, said forming path corresponds to a circular arc which is defined by a rotation of said rotary carousel through approximately 180°.

In this way, half of the rotation of the rotary carousel is used to form the container and the other half to return to the initial condition, so the first and second part of the rotation have equal amplitude. Thanks to this arrangement it is possible to make the blanks arrive at the entry and the formed containers exit through respectively a feeding line and a filling line which are parallel to each other and diametrically opposed to the centre of the rotary carousel. This results in an even more compact and effective development of the entire packing apparatus, which is substantially configured in a U-shape.

According to an embodiment, the filling line comprises an additional feeding line for second articles (for example capsules) which is arranged parallel to and adjacent thereto, so that said second articles enter the packing process near one end of the "U" arrangement of the packing apparatus.

In another embodiment of the invention, said forming path is equal to a rotation about the axis of said carousel through approximately 90°.

Thanks to this technical solution, it is possible to carry out a first forming step in the first 90° of rotation of the carousel, a first step of repositioning of the forming unit in the second 90° of rotation, a second step of forming in the third 90° of rotation and a second step of repositioning of the forming unit in the fourth 90° of rotation, thus allowing to work continuously with two independent process lines. In this case, therefore, the inlet and outlet lines are arranged in a cross arrangement, i.e. oriented inclined through 90° each one with respect to the following one.

According to one embodiment, these inlet and outlet lines can extend in different directions with respect to the rotary carousel, for example radially or tangentially.

In addition, these inlet and outlet lines can be arranged between them at different heights from the ground so as to avoid a possible intersection thereof and thus further reduce the overall space required.

Still preferably, such entry and outlet lines may develop with an arrangement, always seen from above, along directions that are parallel with the two exit lines and respectively along directions that are parallel with the two inlet lines, if the lines were substantially tangent to the circular path of the carousel itself.

In addition, thanks to the technical solution that provides for creating two independent process lines, it is possible to manage, through a single forming unit operating continuously, two process mono-flows that can use, for example, different types of blanks destined then to different types of articles intended to be packaged.

Preferably, said seat has a hollow box-shaped form.

Preferably, said seat comprises an upper opening so as to allow said piston to pass freely through it.

This optimises the interaction between the piston and the seat in order to produce the box-shaped container.

Moreover, thanks to the upper opening, the entry and exit by the piston into the seat is particularly facilitated and effective.

According to one embodiment, said seat comprises such a lower opening as to allow the discharge of said blank from said seat.

In this way, the step of discharging the formed container formed from the blank can also be carried out simply and effectively by further moving the piston along the predetermined vertical trajectory.

Preferably, said forming device comprises a belt by means of which said piston can move along said predefined trajectory.

In this way the movement of the piston can be carried out in a simple, effective and precise way.

Preferably, said forming device comprises pre-folding elements for pre-folding flaps or strips forming part of said blank.

In this way it is possible to prepare the ends of the blank that are particularly rigid and difficult to fold for a subsequent processing step. This condition becomes particularly critical when significantly short flaps or strips must be glued that have a high elastic memory or an intense elastic response to folding and that need to be deformed by folding them over 90° along a folding axis in order to be able to glue them effectively afterwards.

It is also interesting to note that the folds produced in the blank can be made in a preferred but not limited manner along pre-existing creased portions interposed between panels or portions of the blank. This results in better quality, more uniform and consistent folding of the blank and forming of the container. However, it is possible to carry out said folding and/or forming operations on parts of the blank that do not have creased portions.

Preferably, said forming device comprises a motor element which is provided to move said piston along said predefined trajectory so as to identify at least the following positions:

- An upper position which identifies the maximum spacing of said piston from said seat,
- A forming start position of said blank, in which said piston engages with said blank at an abutment panel thereof outside said seat and with a predetermined minimum spacing therefrom,
- A forming end position for said blank, in which said piston is at least partially inserted inside said seat and thus said blank, under the pressure of said piston, is folded in said seat in order to form said container.

This makes it even clearer that, thanks to a single trajectory of the piston, it is possible to define different processing steps with simple precision, and it is also possible to complete the forming of the blank without automatically causing them to exit the seat.

Preferably, said motor element is provided to move said piston along said predefined trajectory so as to identify a discharge position of said blank from said seat in which said piston moves away from said upper position beyond said forming end position causing said blank to be completely discharged from said lower opening of said seat.

In this way it is possible to selectively decide at which moment in the forming process the formed container is to be discharged from the seat.

Thanks to this technical solution, it is also possible to configure the forming device so that it does not necessarily proceed with the discharge if so desired.

Preferably, when the blank is discharged, it has a configuration of container which is open at the top.

According to an embodiment, the forming unit comprises a gripping device which is positioned at said discharge position of said blank and which is configured in such a manner that it can selectively retain said container once it is discharged from the seat.

In this way, it is prevented that the discharged box-shaped container that has come out of its seat may accidentally fall to the ground, for example in the event of the conveyor stopping.

Preferably, said gripping device comprises movable grippers.

According to an embodiment, the grippers are moved by cam or parallelogram kinematics with articulated arms.

Preferably, the gripping device comprises gripping elements that act with pressure reduction.

Preferably, said seat has a uniform rectangular section.

According to a preferred embodiment, said seat comprises at least one folding facilitating portion.

According to an embodiment, said seat is formed so as to induce a folding of said blank when it is moved in said seat by said piston at least in a first folding zone between said abutment panel and a front panel connected thereto.

Preferably, said seat is formed so as to induce a folding of said blank when it is moved in said seat by said piston at least in a second folding zone between said abutment panel and a rear panel connected thereto.

Preferably, said seat is formed so as to induce a folding of said blank when it is moved in said seat by said piston at least in a third folding zone between said front panel and lateral panels connected thereto.

Furthermore, preferably the shape of the folding facilitating portion and/or of the seat allows the folding on the blank to be carried out in a gentle and not abrupt manner, thus optimising the synergic collaboration between the piston that moves the blank inside the seat along the first and/or the second and/or the third folding zone towards the forming end position.

According to one embodiment, said folding facilitating portion comprises a plurality of guides.

Preferably, such guides are substantially in the form of a three-dimensional track projecting from the seat and formed so as to induce deformations and movements of the blank during the vertical movement of the piston inside said seat.

Preferably, said motor element which is provided to move said piston is controlled independently with respect to said conveyor, in such a manner that said motor element can move said piston until it completes the forming of said blank even in the case of said conveyor stopping.

In this way it is possible to complete the forming of the blanks that have entered the forming unit and thus being able to avoid wasting blanks on which adhesive spots have already been dispensed, which would otherwise dry out. Thus, thanks to the independent motor element which is provided to move each piston, the containers formed from the blanks that have not yet reached the completion of forming due to the main motor of the conveyor stopping, which in the prior art determines all the operations of the forming unit, can be completed.

Preferably, said piston is connected to said motor element by means of a movement transmission device.

Preferably, said movement transmission device is configured to allow a desired vertical downward or upward movement of a predetermined extent.

Preferably, said movement transmission device comprises a belt which is secured to said piston and to said motor element.

It will be noted that in the embodiment described above, it is provided only one motor which controls the movement of the component of the forming device intended to carry out the forming of the blank (in this case the movement of the piston inside the seat).

In another embodiment, there is provided a main motor element which controls the movement of the piston inside the seat and an auxiliary motor element which intervenes by modifying the movement of the piston in case of need. In this case, the main motor element can be directly controlled by the main motor of the conveyor, while the auxiliary motor element is independent of the main motor and is provided to complete, if necessary, the movement of the piston in case of the main motor of the conveyor stopping.

In this case, the movement transmission device preferably comprises a connection system capable of relatively modifying the movement of the piston with respect to the movement imposed by the main motor element. This solution can be achieved by means of multiple cams or articulated arms or similar kinematic elements.

These features further emphasise the independent and autonomous nature of the forming device with respect to the forming unit and/or other stations of the packing apparatus.

Preferably, the forming unit comprises a plurality of said forming devices.

Thanks to this solution, it is possible to increase the number of blanks that can be processed simultaneously, thereby increasing productivity.

Preferably, said plurality of forming devices is arranged on said rotary carousel and the forming devices of said plurality are arranged between them with a uniform angular spacing.

This makes it easier and more efficient to arrange and regulate the entry and exit steps of the blanks and of the containers respectively between them.

Preferably, the plurality of forming devices is equal to twelve or sixteen for a rotary carousel.

Preferably, said piston and said seat are constructed from polymer-based fibre-reinforced composite material.

This makes the piston and the corresponding seat particularly light, so that they can be replaced and transported by a single operator.

Preferably, said piston and said seat comprise at least one rapid-disengagement device in order to be disengaged from said forming device.

In this way the piston and the corresponding seat can be replaced quickly and easily.

Thanks to these features, the format changeover of the containers can be advantageously carried out quickly and easily.

Preferably, the packing apparatus comprises an adhesive spot distribution device which is positioned upstream of said forming unit and which is capable of applying spots of adhesive to predetermined faces of said blank before said blank is subjected to forming.

In this way the preparation steps for forming the blank are optimized.

According to one embodiment, the adhesive spot distribution device comprises nozzles or guns suitable for dispensing predetermined amounts of adhesive.

Preferably said adhesive spot distribution device is movable into a purging zone.

More preferably, said nozzles are housed on an arm rotating about a rotation axis which is oriented in a vertical direction and positioned near a distal end of the arm with respect to the rotation axis of the carousel.

This allows the arm to be easily rotated and brought into a position spaced apart from the blanks transport and process line (the purging zone) in order to be able to safely clean the aforesaid nozzles or to perform other desired maintenance tasks without risking soiling or damaging the guides or other parts of the packing apparatus.

Preferably, the method for forming a container according to the third aspect of the present invention provides that the forming device is directed by said conveyor along a substantially circular forming path.

Preferably, said forming phase is started and completed over a rotation of the first 180° of said rotary carousel.

Preferably, a step of repositioning in an initial condition corresponding to said upper position of said forming device is completed over a rotation of the second 180° of said rotary carousel.

This optimises the forming and positioning steps with respect to the rotary carousel, and by simply varying its diameter and/or the angular speed of rotation, it becomes possible to adapt it to different process needs.

The characteristics and advantages of the invention will become clearer from the detailed description of an embodiment illustrated, by way of non-limiting example, with reference to the appended drawings wherein.

Figure 5:
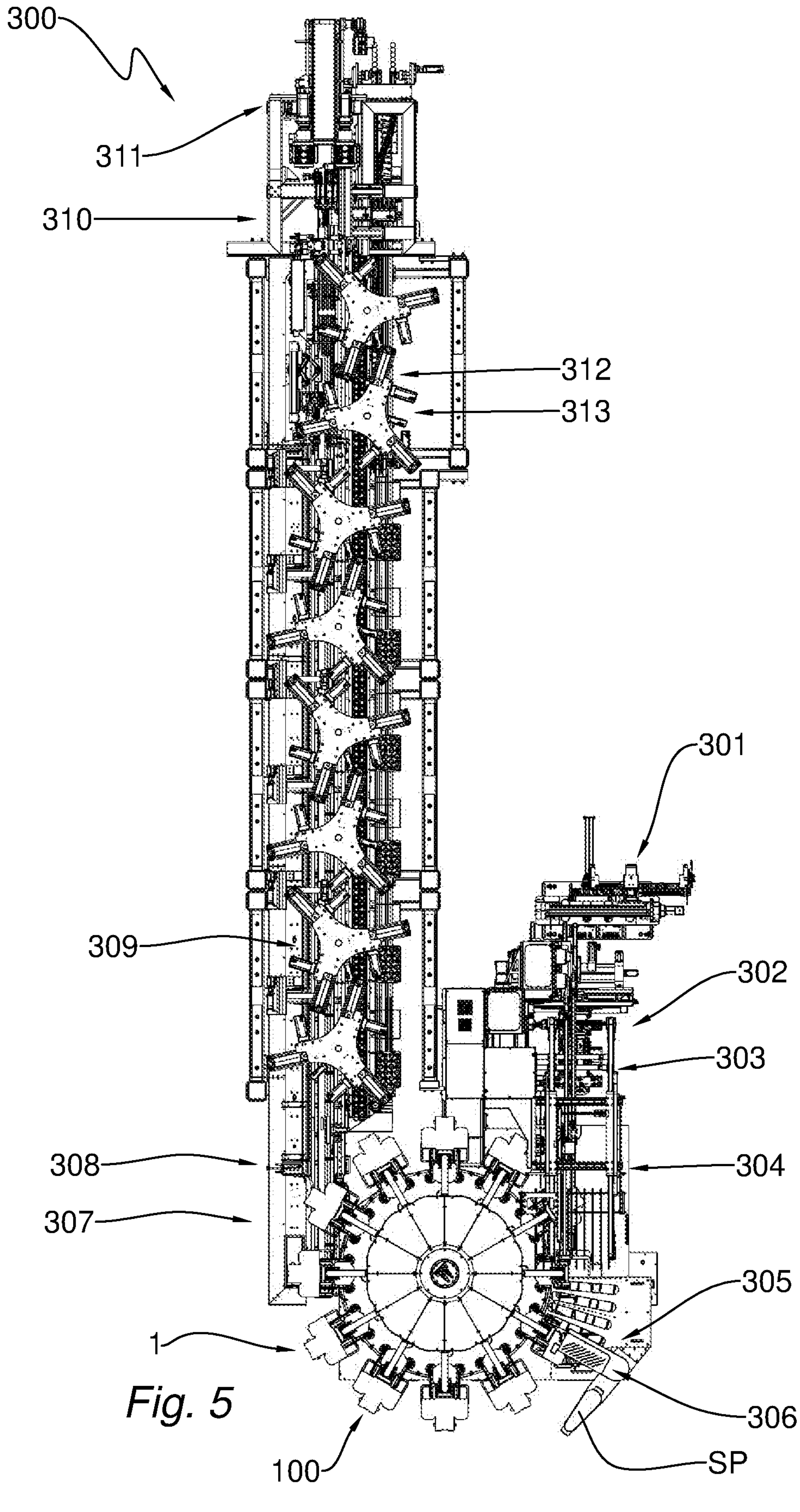
FIG. 5 is a top view of a packing apparatus for articles comprising the forming unit of FIG. 1.

With initial reference to FIG. 5, 300 denotes a packing apparatus which is provided to form a container 290 from a blank 200 and, further, to fill the container thus formed with a plurality of loose articles, so as to obtain a finished package intended to be packaged for shipment.

The exemplary embodiment described below refers to articles to be packed in a container, in particular a box-shaped container in which articles that are different from each other, or the same but in different configurations, are arranged in a sorted manner, for example arranged on superimposed layers.

In the specific case described herein, the articles with which the containers are filled are capsule elements for the preparation of beverages by infusion, in particular coffee capsules.

In the present example, each blank 200 is a flat laminar element made of foldable, semi-rigid material, for example cardboard, suitably cut and provided with folding lines, preferably formed by creased portions.

Figure 3:
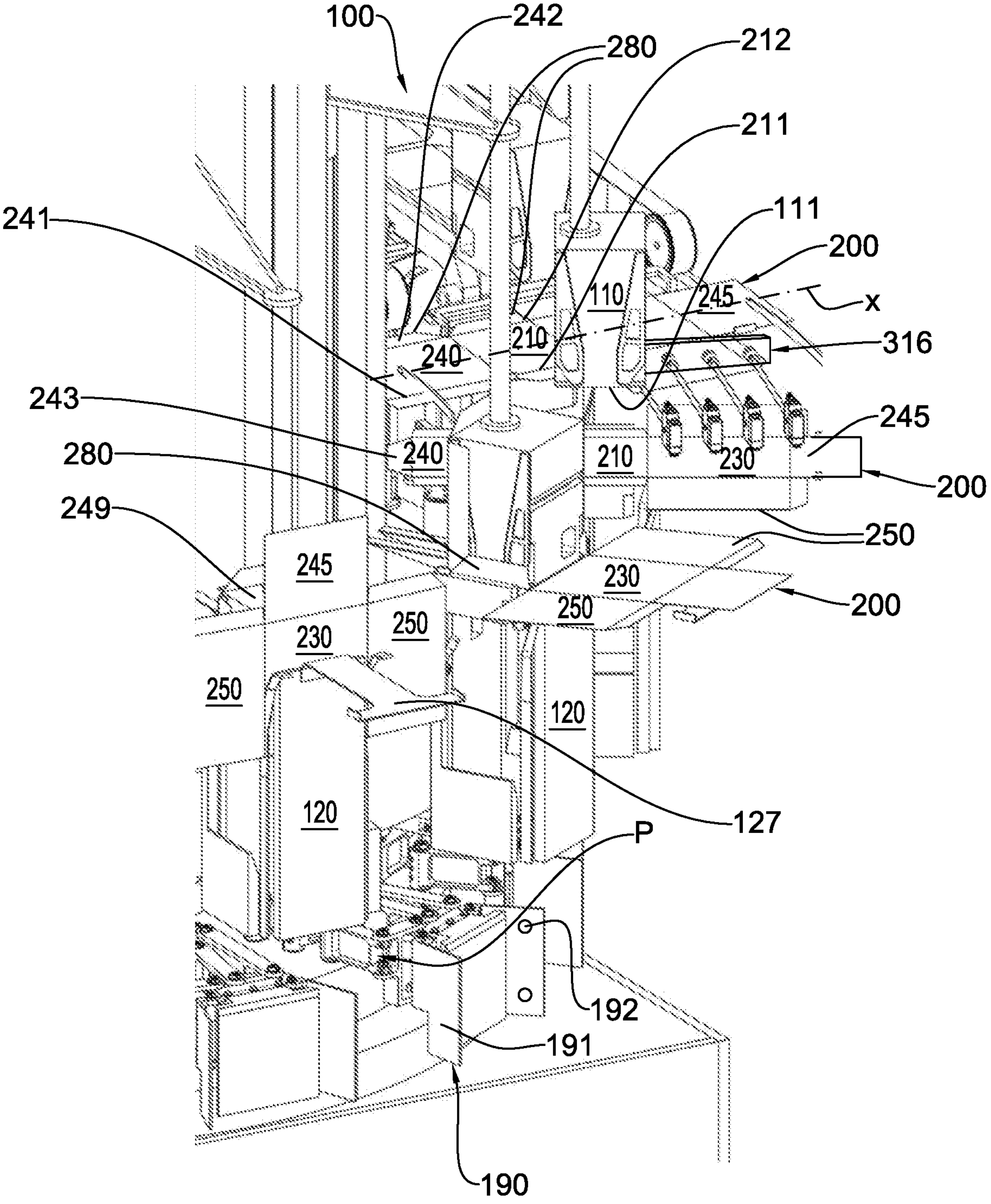
FIG. 3 is a further perspective schematic perspective view on an enlarged scale of a further detail of FIG. 1.
Figure 4:
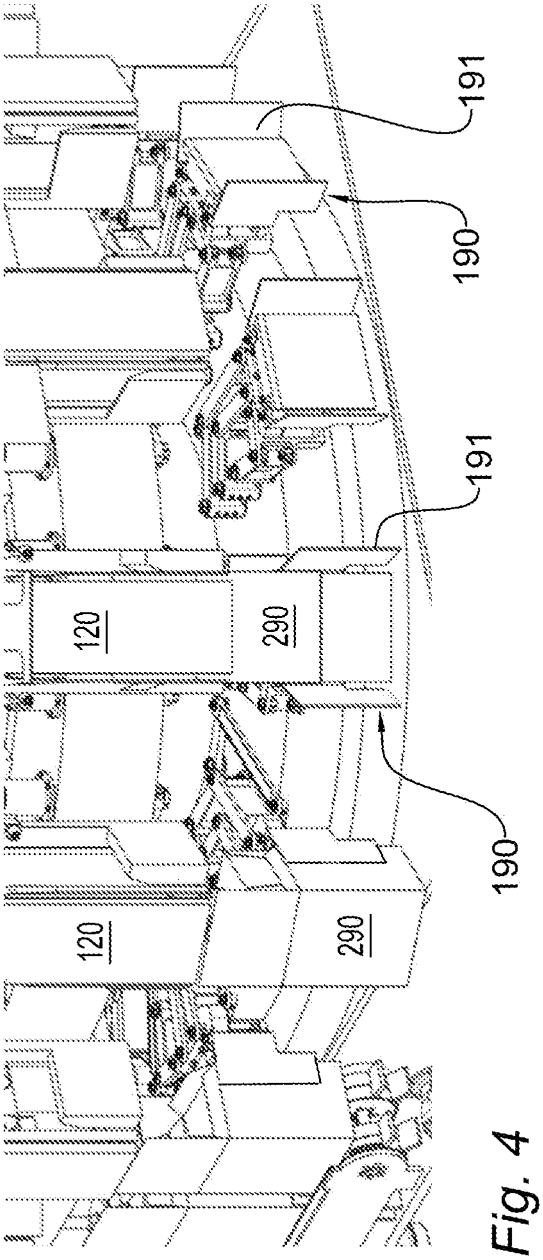
FIG. 4 is a further perspective schematic perspective view on an enlarged scale of a further detail of FIG. 1.

As better visible in FIG. 3, the blank 200 has a substantially cross shape comprising a front panel 230 with a quadrilateral shape from which additional panels branch out according to the normal directions of the respective edges.

More in detail, an abutment panel 210 and a closing panel 245 opposite the front panel 230 with respect to the abutment panel 210 are connected along the longitudinal axis X of the cross shape of the blank from the front panel 230. Again along the longitudinal direction X, there is identified a rear panel 240 which is connected to the abutment panel 210 on the opposite side of the front panel 230.

Further, two opposite lateral panels 250 are identified, which are connected to the front panel 230 at the other two edges thereof of the abutment panel 210. All the aforementioned panels have a quadrilateral shape, preferably rectangular, so that the container 290 obtained from the blank 200 is substantially box-shaped or parallelepiped.

In particular, the abutment panel 210 will define the bottom of the container 290, while the rear panel 240, the front panel 230, and the lateral panels 250 of the blank 200 will correspond respectively to the rear wall, to the front wall and to the lateral walls of the container. Finally, the closing panel 245 will define an openable wall of the container 290, which is intended to close an opening 249 defined in the container 290 by the rising of the lateral panels 250, of the front panel 230 and of the rear panel 240.

Preferably, the abutment panel 210 and the rear panel 240 have, on each edge 211, 212, 241, 242 which branches parallel to the longitudinal axis X of the blank 200, respective longitudinal fixing flaps 280 having an isosceles trapezoid shape, with a free edge connected by inclined edges.

Additional flaps can be made on any free edge of each panel of the blank.

The rear panel 240 also has, in addition to the longitudinal fixing flaps 280, a closing flap 243 which is articulated to the rear panel 240 on the opposite side of the abutment panel 210.

In particular, the container 290 is formed at a forming unit 1 of the packing apparatus 300, which is provided for the continuous transformation of the initial blank 200 into the final shape of the container 290, which is functional for the subsequent operations of the packing apparatus 300.

The packing apparatus 300 has a first line 301 which is supplied at a first inlet end thereof with a stack of blanks 200 by means of a supply station 302.

The supply station 302 performs the extraction of the single blanks 200 and is connected to a folding station 304 in which the blanks 200 are arranged in a configuration in which they are sent on a blanks conveyor 303. In the folding station 304, the blanks 200 undergo a preliminary folding of the respective panels and of the longitudinal fixing flaps 280, and are, moreover, correctly spaced apart from each other.

The blanks conveyor 303 travels through a gluing station 305 comprising an adhesive spot distribution device 306 in which a plurality of hot adhesive guns lay suitable adhesive spots on the longitudinal fixing flaps 280 or on the other panels of the blanks 200.

The adhesive spot distribution device 306 comprises adhesive dispensing nozzles which are housed on an arm rotating about a vertical rotation axis and which is positioned near a distal end of the arm with respect to the rotation axis of the rotary carousel 20. Thanks to the ability to rotate, the arm can be conveniently moved to a purging zone.

The blanks conveyor 303 then supplies the forming unit 1, at which the first line 301 forms a curve, assuming a U-shaped configuration.

The forming unit 1 comprises a plurality of forming devices 100, each one arranged to form a container 290 from a respective blank 200, which is delivered to them by the blanks conveyor 303 in the correct position and already provided with the necessary adhesive spots.

As better described below, each forming device 100 forms the respective container 290 by means of suitable folding operations of the panels which form the blank 200, by making the longitudinal fixing flaps 280 adhere to the lateral panels 250 so that the front panel 230, the rear panel 240 remain glued to the front panels, while the closing panel 245 remains open.

At the end of the forming unit 1, the containers 290 are supplied onto a package conveyor 307 which includes a station for opening the openable wall 245 of the containers 290, so as to keep the opening of the containers 290 clear of obstacles, until filling is complete.

The package conveyor 307 follows a straight path in which the single containers 290 are filled with layers of articles intended to be packed, which are transferred into them by means of a plurality of robotic filling devices 309, which are arranged in line alongside the container conveyor and supported by an overlying cage frame. Once the filling is complete, the containers 290 arrive at a closing station 310, wherein the openable wall 245 of each package is made to adhere to the respective opening. Subsequently, the closed containers 290 reach a discharge end 311, from which they are sent to a packaging apparatus (not shown in the figure).

The packing apparatus 300 further has a second line 312 that is supplied by a first conveyor that transports the capsule elements in an upright configuration in a substantially disordered manner.

The first conveyor is connected to a sorting station 313, in which the capsule elements are arranged on a predetermined number of rows of a conveyor belt which is directed in a parallel direction but in the opposite direction with respect to the package conveyor 307. In the sorting station 313 the capsule elements are correctly positioned for their transfer into the container 290. In particular, the articles are spaced apart and arranged according to an appropriate configuration that allows the best compaction conditions inside the container. Downstream of the sorting station 313, the articles are removed by robotic filling devices 309 and deposited in successive layers inside the containers 290.

Figure 1:
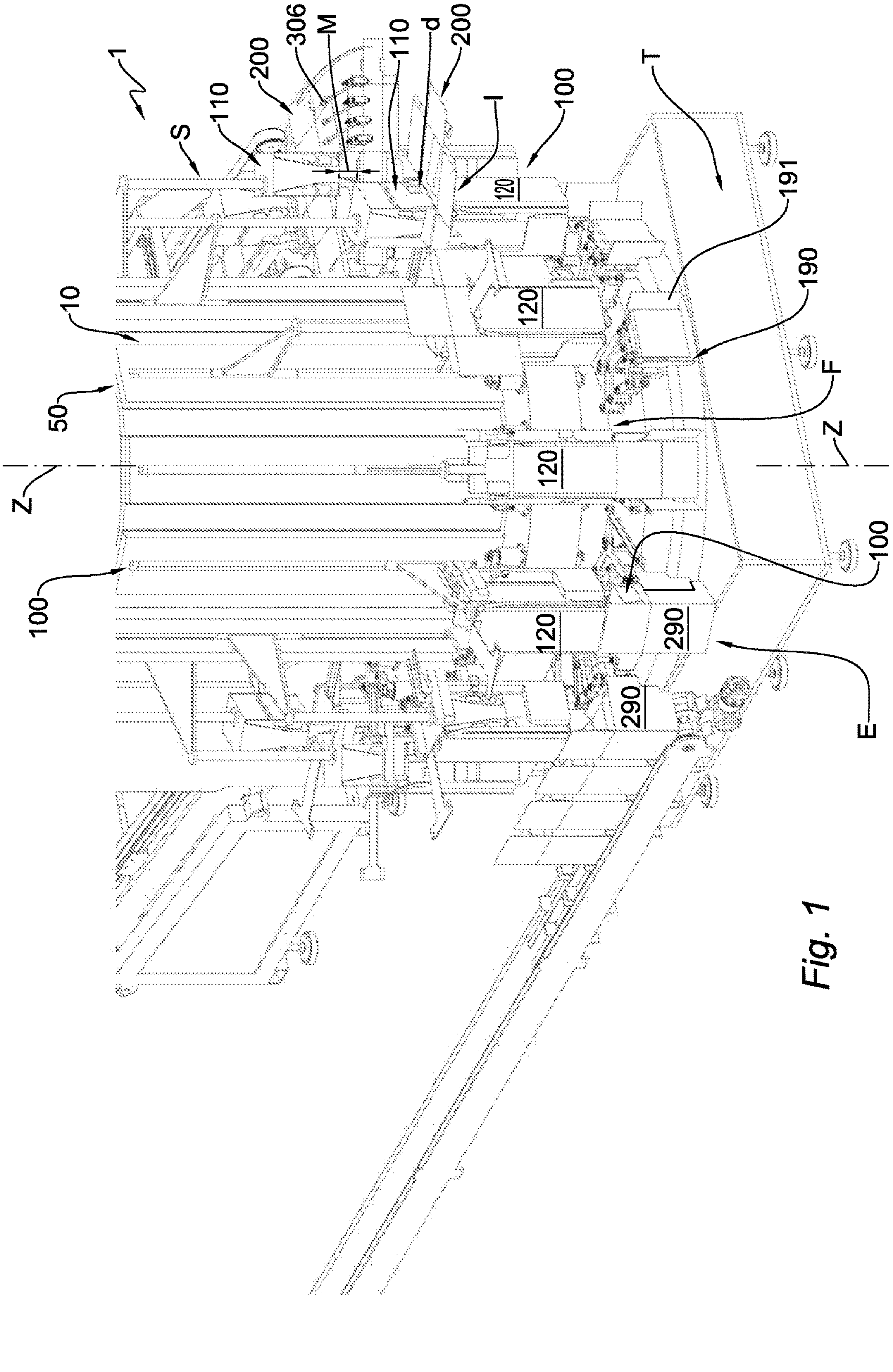
FIG. 1 is a schematic perspective view of a portion of a forming unit made in accordance with the present invention.

In more detail and with reference to FIG. 1, the forming unit 1 comprises a conveyor 10 which moves with continuous movement. Such a conveyor 10 is a rotary carousel 20 which is provided to rotate about its vertical rotation axis Z and comprising twelve equipments 50 that are fixedly secured thereto. Each equipment 50 comprises a respective forming device 100 which is provided to perform a forming of the container 290 starting from the blank 200 during a predetermined forming path T on the carousel 20.

Alternatively, the conveyor 10 may be formed, for example, by a belt.

The forming device 100 comprises a piston 110, which is formed to removably engage on the abutment panel 210 of the blank 200, as well as a seat 120, which is formed to receive within it the piston 110 and to induce and/or allow the container 290 to be formed while the blank 200 is moved by the piston 110 within the seat 120 along a predefined trajectory t.

The movement of the rotary carousel 20, and in particular of the seats 120, substantially define a movement direction D included on a movement plane P, which is substantially horizontal, while the forming device 100 and the predefined trajectory t have a substantially vertical orientation, which is perpendicular to the movement plane P.

The piston 110 has a substantially parallelepiped shape on which it is identified an abutment face 111 which is placed in the direction of the seat 120 and formed to abut and exert a pressure on the abutment panel 210 of the blank 200 so as to push it inside the seat 120.

The forming device 100 further comprises a motor element 140, which is provided to move the piston 110 along the predefined trajectory t by means of a movement transmission device comprising a belt 130. In particular, the belt 130 is fixed by means of a support 132 to a rod 115 extended from the piston 110 on the side opposite the seat 120.

The seat 120 has a substantially hollow box-shaped form, in which the piston 110 can freely slide, and is extended along a substantially vertical longitudinal direction, coinciding with the predefined trajectory t, and has an upper opening 129 and a longitudinally opposed lower opening **129*b***.

Figure 2:
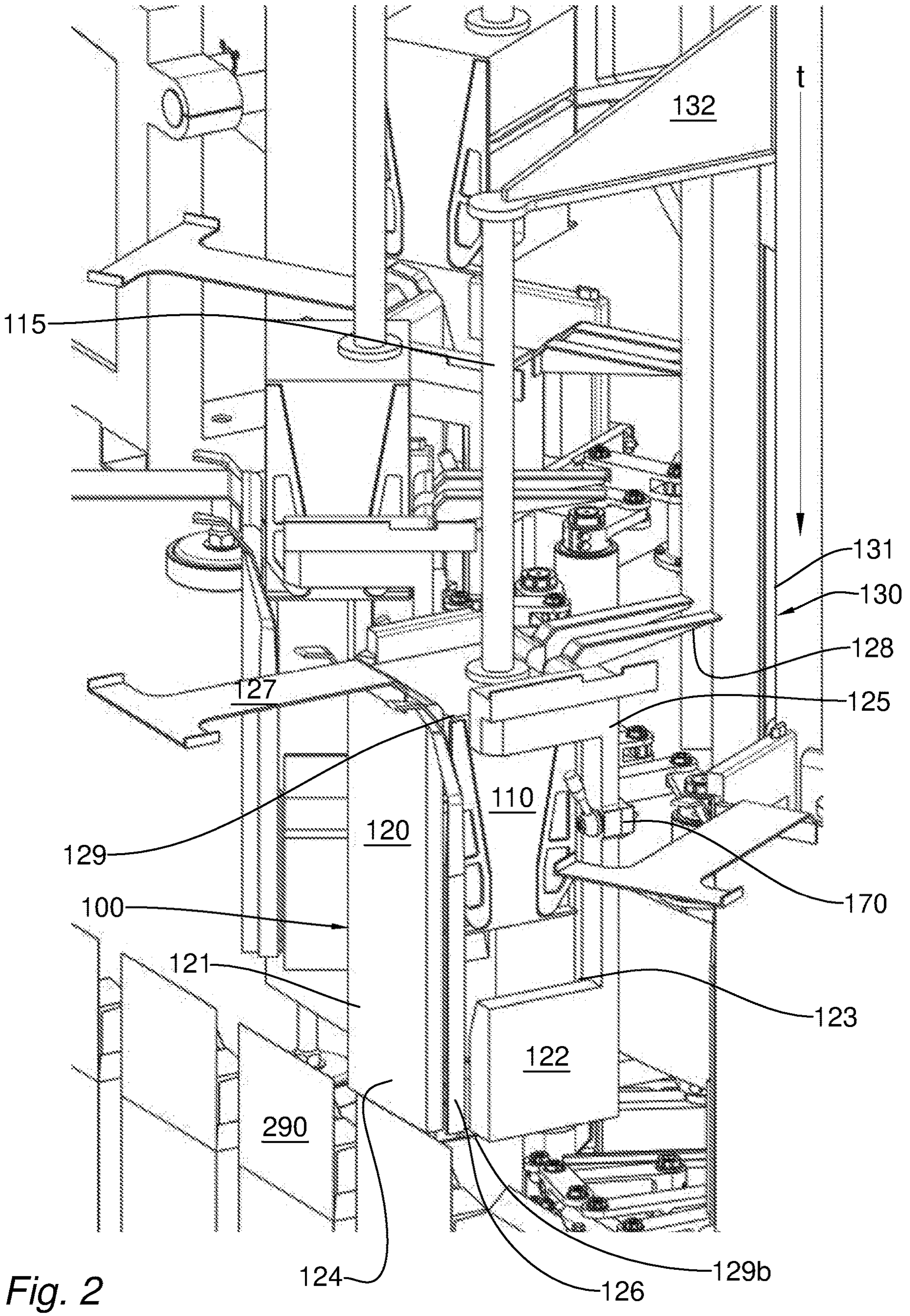
FIG. 2 is a perspective schematic perspective view on an enlarged scale of a detail of FIG. 1.

As better visible in FIG. 2, the seat 120 comprises a front wall 121 which is positioned radially distal to the rotation axis Z of the rotary carousel 20, a rear wall 123 opposite the front wall 121 and positioned radially proximal to the vertical rotation axis Z of the rotary carousel 20, as well as lateral walls 122 which complete the box-shaped structure of the seat 120.

Preferably, the seat 120 comprises a front support 127 having the form of a T-panel radially projecting away from the rotation axis of the rotary carousel 20 and positioned on the front wall 121 near the upper opening 129. This front support 127 acts as a support for the front panel 230 and/or the openable wall 245 of the blank 200 during the forming steps.

Similarly, the seat 120 comprises a rear support 128 radially projecting towards the rotation axis of the rotary carousel 20 and positioned on the rear wall 125 near the upper opening 129.

Preferably, the rear support 128 comprises a rear opening, substantially rectangular, which is configured to let the support 132 of the belt 130 pass and to allow the piston 110 to slide freely along the predefined trajectory t inside the seat 120.

The support 132 is preferably a bracket with main vertical dimensional development, so that the rear opening requires as little space as possible to be able to pass through the rear support 128.

The piston 110, in its movement along a predefined trajectory t, defines the following positions with respect to the seat 120:

- an upper position S which identifies the maximum spacing M of the piston 110 from the seat 120,
- a forming start position I of the blank 200, in which the piston 110 engages with the blank 200 at the abutment panel 210 outside the seat 120 and at a predetermined minimum spacing d therefrom,
- a forming end position F of the blank 200, in which the piston 110 is at least partially inside the seat 120 and thus the blank 200, under the pressure of the piston 110, is folded inside the seat 120 in order to form the container 290, and
- a discharge position E of the blank 200 from the seat 120 in which the piston 110 moves further away from the upper position S, beyond the forming end position F, causing the blank 200 to be completely discharged from the seat 120.

The seat 120 comprises a plurality of guides 126 which allows the folding of the blank 200 to be carried out by synergistic collaboration with the piston 110 which pushes the blank 200 inside the seat 120 between the forming start position I and the forming end position F.

In particular, the foldings take place along a first, a second and a third folding zone P1, P2, P3 which are defined respectively between the abutment panel 210 and the front panel 230, the abutment panel 210 and the rear panel 240, the front panel 230 and the lateral panels 250.

Preferably, the plurality of guides 126 is formed to initially induce the vertical rotation of the front panel 230 and the lateral panels 250 which are connected thereto. At the same time, the rear panel 240 is also rotated vertically. Subsequently, the lateral panels 250 are rotated with respect to the front panel 230, so as to close the blank 200 laterally and thus form the box-shaped container 290.

In order to further optimise this forming of the blank 200, the seat 120 comprises folding facilitating portions placed below on the lateral walls 122 which further push the lateral panels 250 towards the desired final position, favouring the mutual gluing step of the panels and of the longitudinal fixing flaps.

According to an embodiment, the seat 120 comprises lateral openings 123 made on the lateral walls 122 which facilitate the rotation for closing the lateral panels 250 of the blank.

With particular reference to FIGS. 1 and 5, it can be noted that the forming path T is equal to an axial rotation of the rotary carousel 20 through approximately 180°, the remaining 180° being used to return the piston 110 to the initial forming position, i.e. the upper position S.

The motor element 140 is preferably an electric motor and is powered and controlled independently of the forming unit 1 itself, so that even if the rotary carousel 20 stops, the motor element 140 is able to move the piston 110 as far as the forming end position F in order to complete the forming of the blank 200, at least for the forming devices 100 already provided with the blank 200.

In an alternative embodiment, not illustrated herein, the motor element 140 is powered and controlled independently of the forming unit 1, but collaborates with a main motor of the same unit which is used to also move the piston 110 in the various desired positions and intervenes, by transferring the movement by means of cams, in the event that the main motor of the unit stops undesirably. In this manner, the motor element 140 is in any case able to bring the piston 110 as far as the forming end position F, thus ensuring that the possibility of producing waste from containers 290 not perfectly closed in the desired times and bound to the cross-linking of the glue already applied on the blank is avoided.

The forming unit 1 further comprises a gripping device 190 which is positioned at the discharge position E of the blank 200 from the seat 120 and is configured in such a manner to be able to selectively retain the container 290 once it is discharged from the seat 120 through the lower opening 129*b*. Preferably, the gripping device 190 comprises movable grippers 191, to which gripping elements 192 are fixed, for example of the suction cup type, which act with pressure reduction.

The piston 110 and the seat 120 are preferably made from carbon fibre or fibreglass and comprise at least one rapid-disengagement device 170 which allows the forming device 100 to be disengaged from the equipment 50, for example to be serviced or replaced with a differently shaped forming device. In FIG. 2 the rapid-disengagement device 170 is shown on the seat 120 but can also be installed on the piston 110.

As can be seen from the foregoing, the forming unit 1 is capable of forming containers 290 from the blanks 200 in a continuous, complete and autonomous manner.

In fact, as clearly illustrated in FIG. 1, the rotary carousel 20 rotates clockwise, starting the forming process in the right part of the figure, immediately downstream of the adhesive spot application device 306, and completing the forming of the container 290, in the left part of the figure, in a continuous manner, without ever interrupting its movement, near the package conveyor 307 to which it transfers the container 290 thus formed.

The forming step is started and completed over a rotation of the rotary carousel 20 equal to approximately 180° while the step of repositioning the forming device 100 in an initial condition corresponding to the upper position S of the piston 110 is completed over a rotation of the rotary carousel 20 of the remaining 180°.

Thanks to these technical solutions, the Applicant has found that a total of at least about 100 containers per minute can be formed with a single-line forming unit.

The invention claimed is:

1. A forming unit for forming a container from a blank of said container, comprising:
- a conveyor, and
- at least one equipment secured to said conveyor, said equipment comprising at least one forming device configured to move with continuous movement and arranged to form a container from said blank during a predetermined forming path on said conveyor,
- wherein said at least one forming device comprises a piston configured to engage with said blank and to move said blank along a predefined trajectory inside a seat, the seat being configured to cooperate with said piston to form said container from said blank,
- wherein said at least one forming device further comprises a motor element for moving said piston along said predefined trajectory and identify at least:
  - an upper position identifying a maximum spacing of said piston from said seat,
  - a forming start position of said blank, wherein said piston engages with said blank at an abutment panel of said blank outside said seat, with a predetermined minimum spacing from said seat, and
  - a forming end position of said blank, wherein said piston is at least partially inserted inside said seat to fold said blank in said seat under pressure of said piston in order to form said container, and
- wherein said motor element is controlled independently with respect to said conveyor so that said motor element moves said piston until said piston completes the forming of said blank even in case of said conveyor stopping.

2. The forming unit according to claim 1, wherein said conveyor is a rotary carousel having a vertical rotation axis.

3. The forming unit according to claim 2, wherein said forming path corresponds to a circular arc defined by a rotation of said rotary carousel about said rotation axis through an angle between 120° and 270°.

4. The forming unit according to claim 1, wherein said conveyor is a rotary carousel having a vertical orientation axis and said predefined trajectory has an orientation substantially parallel with said vertical rotation axis of said rotary carousel.

5. The forming unit according to claim 1, wherein said seat has a hollow box-shaped form and comprises an upper opening for free passage of said piston through said upper opening.

6. The forming unit according to claim 5, wherein said seat comprises a lower opening for discharge of said blank from said seat.

7. The forming unit according to claim 1, wherein said at least one forming device comprises a belt for moving said piston along said predefined trajectory.

8. The forming unit according to claim 1, wherein said motor element is configured to move said piston along said predefined trajectory to further identify:

a discharge position for discharging said blank from said seat, wherein said piston moves away from said upper position beyond said forming end position, to fully discharge said blank from said lower opening of said seat.

9. The forming unit according to claim 1, wherein said seat:

comprises at least one folding facilitating portion and is formed to induce a folding of said blank when said blank is moved in said seat by said piston in one or more of:

a first folding zone between said abutment panel and a front panel connected to the abutment panel, a second folding zone between said abutment panel and a rear panel connected to the abutment panel, and a third folding zone between said front panel and lateral panels connected to the front panel.

10. The forming unit according to claim 1, wherein said at least one forming device comprises a plurality of forming devices.

11. The forming unit according to claim 10, wherein said plurality of forming devices are arranged on said a rotary carousel with a uniform angular spacing.

12. A packing apparatus for packing articles comprising the forming unit of claim 1.

13. The packing apparatus according to claim 12, further comprising an adhesive spot distribution device positioned upstream of said forming unit and configured to apply spots of adhesive to predetermined faces of said blank before said blank is subjected to forming.

14. The packing apparatus according to claim 13, wherein said adhesive spot distribution device is movable into a purging zone.

* * * * *